(12) United States Patent
Roberts et al.

(10) Patent No.: US 9,478,886 B1
(45) Date of Patent: Oct. 25, 2016

(54) JACK WITH CYLINDRICAL HOUSING

(71) Applicant: GOOGLE INC., Mountain View, CA (US)

(72) Inventors: Rachael Elizabeth Roberts, San Francisco, CA (US); Joseph Edward Clayton, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/300,745

(22) Filed: Jun. 10, 2014

(51) Int. Cl.
*H01R 13/04* (2006.01)
*G06F 1/16* (2006.01)

(52) U.S. Cl.
CPC ............ *H01R 13/04* (2013.01); *G06F 1/1684* (2013.01)

(58) Field of Classification Search
CPC .............. H01R 24/58; H01R 2105/00; H01R 2107/00; H01R 13/04; G06F 1/1684
USPC ........ 439/668, 593, 669; 361/679.27–679.29
See application file for complete search history.

(56) References Cited

U.S. PATENT DOCUMENTS

| | | | | |
|---|---|---|---|---|
| 7,988,498 B1* | 8/2011 | Lim | ....................... | H01R 24/58 439/668 |
| 8,123,569 B2* | 2/2012 | Little | ..................... | H01R 13/52 439/669 |
| 8,257,116 B2* | 9/2012 | Zhu | ........................ | H01R 24/58 439/541.5 |
| 8,465,329 B2* | 6/2013 | Fields | ................ | H01R 13/7039 439/188 |
| 8,801,472 B1* | 8/2014 | Yen | ...................... | H01R 13/703 439/668 |
| 8,834,208 B2* | 9/2014 | Strittmatter | ............ | H01R 43/20 439/668 |
| 9,130,302 B1* | 9/2015 | Yang | .................... | H01R 13/521 |
| 2005/0146844 A1* | 7/2005 | Hussaini | ................ | G11B 33/02 361/679.29 |
| 2013/0109248 A1* | 5/2013 | Rothkopf | ............ | H01R 13/187 439/786 |
| 2014/0273590 A1* | 9/2014 | Sharma | ................ | G06F 1/1669 439/350 |

OTHER PUBLICATIONS

"Apple iPod Shuffle USB Cable", Shop iPod, Mar. 13, 2014, 1 page.
Power Jack, NotebookCheck. com, Mar. 13, 2014, 1 page.

* cited by examiner

*Primary Examiner* — Neil Abrams
*Assistant Examiner* — Travis Chambers
(74) *Attorney, Agent, or Firm* — Brake Hughes Bellermann LLP

(57) ABSTRACT

A jack may comprise a contact clip and a housing. The housing may be generally cylindrical and bounded by an imaginary cylinder. The housing may define a substantially cylindrical cavity and a contact aperture. The substantially cylindrical cavity may have an opening at a first end of the housing. The contact aperture may be configured to receive the contact clip. The contact aperture may extends from an outer surface of the housing to the cylindrical cavity. The contact clip may be friction-fitted into the contact aperture and extend into the substantially cylindrical cavity.

24 Claims, 22 Drawing Sheets

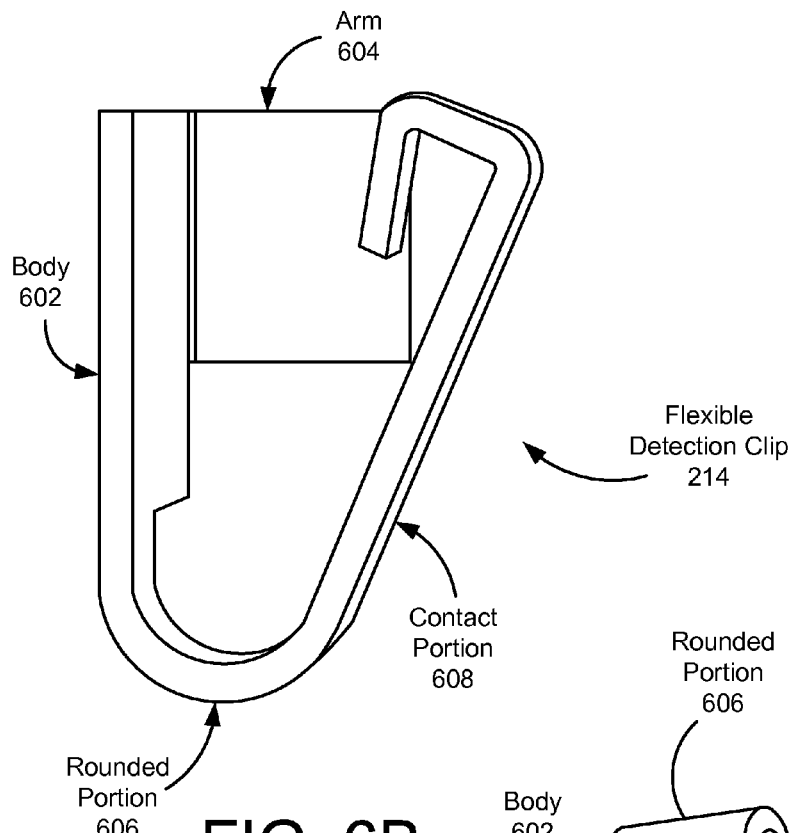
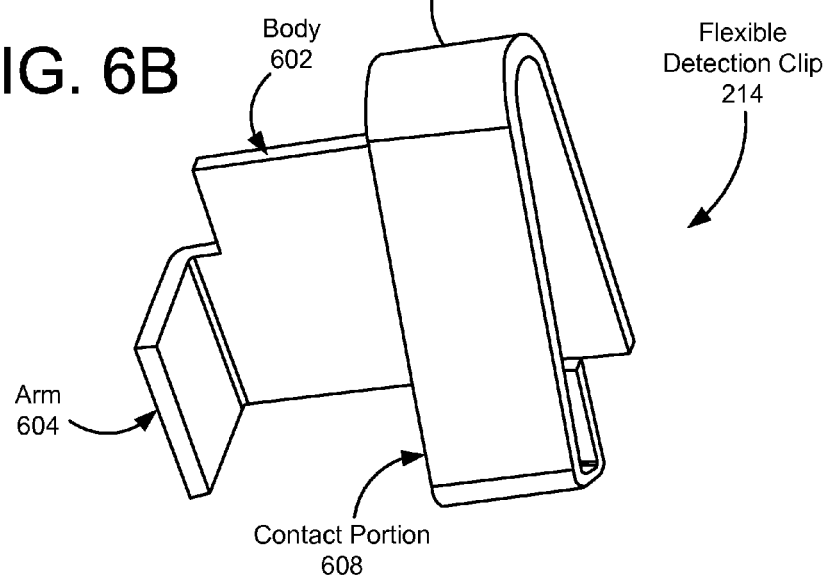

JACK WITH CYLINDRICAL HOUSING

TECHNICAL FIELD

This description relates to electrical jacks.

BACKGROUND

Electrical jacks may receive, and/or be coupled with, pins or plugs that carry electrical signals. Some jacks may occupy an undesirably large amount of space.

SUMMARY

According to one general aspect, a jack may comprise a contact clip and a housing. The housing may be generally cylindrical and bounded by an imaginary cylinder. The housing may define a substantially cylindrical cavity and a contact aperture. The substantially cylindrical cavity may have an opening at a first end of the housing. The contact aperture may be configured to receive the contact clip. The contact aperture may extends from an outer surface of the housing to the cylindrical cavity. The contact clip may be friction-fitted into the contact aperture and extend into the substantially cylindrical cavity.

According to another general aspect, a laptop computer may comprise a base including at least one processor, at least one memory device, and at least one human interface device, a lid comprising a display in communication with the at least one processor, the lid being rotatably connected to the base by a hinge, and the hinge defining a cylindrical recess, the cylindrical recess enclosing an audio jack. The audio jack may comprise a contact clip, a housing bounded by the cylindrical recess, and a flexible printed circuit board (PCB). A majority of an outer surface of the housing may be contiguous with the cylindrical recess. The housing may define a cylindrical cavity and a contact aperture. The cylindrical cavity may have an opening at a first end of the housing. The contact aperture may be configured to receive the contact clip. The contact aperture may extend from the outer surface of the housing to the cylindrical cavity. The PCB may be coupled to the contact clip and the at least one processor. The contact clip may be friction-fitted in the contact aperture. The contact clip may extend into the cylindrical cavity.

According to another general aspect, a laptop computer may comprise a base, a lid, and a hinge. The base may include at least one processor, at least one memory device, and at least one human interface device. The lid may comprise a display in communication with the at least one processor. The lid may be rotatably connected to the base by the hinge. The hinge may define a cylindrical recess with a diameter of no more than 6.4 millimeters. The cylindrical recess may enclose an audio jack. The audio jack may comprise a contact clip, a flexible detection clip, a rigid detection clip, a housing, and a flexible printed circuit board (PCB). The housing may be bounded by the cylindrical recess. A majority of an outer surface of the housing may be contiguous with the cylindrical recess. The housing may define a cylindrical cavity, the cylindrical cavity having an opening at a first end of the housing, a contact aperture configured to receive the contact clip, the contact aperture extending from the outer surface of the housing to the cylindrical cavity, a flexible detection aperture configured to receive the flexible detection clip, the flexible detection aperture extending from the outer surface of the housing to the cylindrical cavity, and a rigid detection aperture configured to receive the rigid detection clip, the rigid detection aperture extending from the outer surface of the housing to the cylindrical cavity. The PCB may be coupled to the contact clip, the flexible detection clip, the rigid detection clip, and the at least one processor. The contact clip may be friction-fitted in the contact aperture and extend into the cylindrical cavity. The flexible detection clip may extend into the cylindrical cavity and be configured to bend toward and contact the rigid detection clip in response to the cylindrical cavity receiving a plug. The rigid detection clip may extend through the rigid detection aperture.

The details of one or more implementations are set forth in the accompanying drawings and the description below. Other features will be apparent from the description and drawings, and from the claims.

BRIEF DESCRIPTION OF THE DRAWINGS

FIGS. 6A, 6B, 6C, 6D, and 6E are diagrams of a flexible detection clip included in the jack.

Like reference numbers refer to like elements.

DETAILED DESCRIPTION

Figure 1:
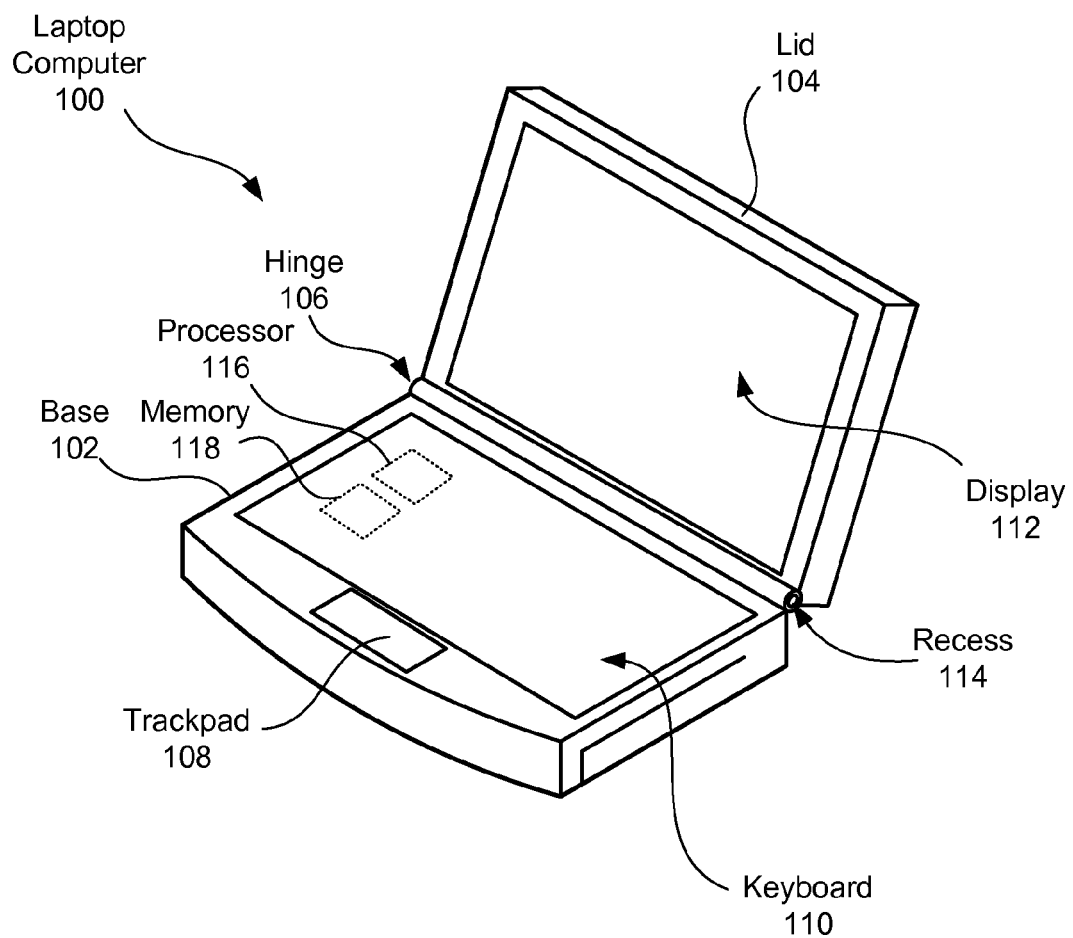
FIG. 1 is a diagram of a laptop computer.

FIG. 1 is a diagram of a laptop computer 100. Laptop computer 100 may include a base 102 and a lid 104. The base 102 and the lid 104 may be hingedly and/or rotatably connected to each other by a hinge 106. The hinge 106 may allow the lid 104 to rotate with respect to the base 102, and/or may enable the base 102 to rotate with respect to the lid 104. The base 102 may include computing components such as at least one processor 116 coupled to at least one memory device 118. The base 102 may also include at least one human interface device such as a trackpad 108 and/or keyboard 110. The lid 104 may include a display 112. The display 112 may present images to a user. The display 112 may be electrically coupled to the processor 116 included in the base 102 via electronic circuitry included in the hinge 106.

As mentioned above, the hinge 106 may allow the base 102 and lid 104 to rotate with respect to each other, enabling a user to close the laptop computer 100 for storage by rotating the lid 104 toward the base 102 so that the display 112 and keyboard 110 are facing each other. The hinge 106 may also enable the user to open the laptop computer 100 by pulling the lid 104 away from the base 102 so that the display 112 is visible to the user and the user has room to type into the keyboard and touch the trackpad 108. The hinge 106 may be cylindrical. The cylindrical shape of the hinge 106 may make it difficult for the hinge 106 to accommodate non-cylindrical components.

The hinge 106 may include and/or define a recess 114, which may be cylindrical itself with an axis parallel to, or aligned with an axis of the cylindrical hinge 106. The recess 114 may include or be adjacent to electrical contacts. The electrical contacts may carry electrical signals, such as audio signals to and/or from an electronic device, such as a headphone set, speakers, and/or microphone, outside the laptop computer 100, from and/or to components inside the base 102 such as the processor 116.

The recess 114 may be cylindrical. The substantially cylindrical shape of the recess may correspond to the cylindrical shape of the hinge 106, minimizing a volume of the hinge 106 interposed between the recess 114 and an outer surface of the hinge 106. The recess 114 may have a diameter of, for example, no more than 6.4 millimeters, or less than 6.4 millimeters. The recess 114 may receive a jack (not shown in FIG. 1), such as an audio jack, which may couple to the electrical contacts included in or adjacent to the recess 114, and communicate with the components in the base 102. It may be desirable to minimize a size of the jack so that the jack may fit into the recess 114.

Figure 2A:
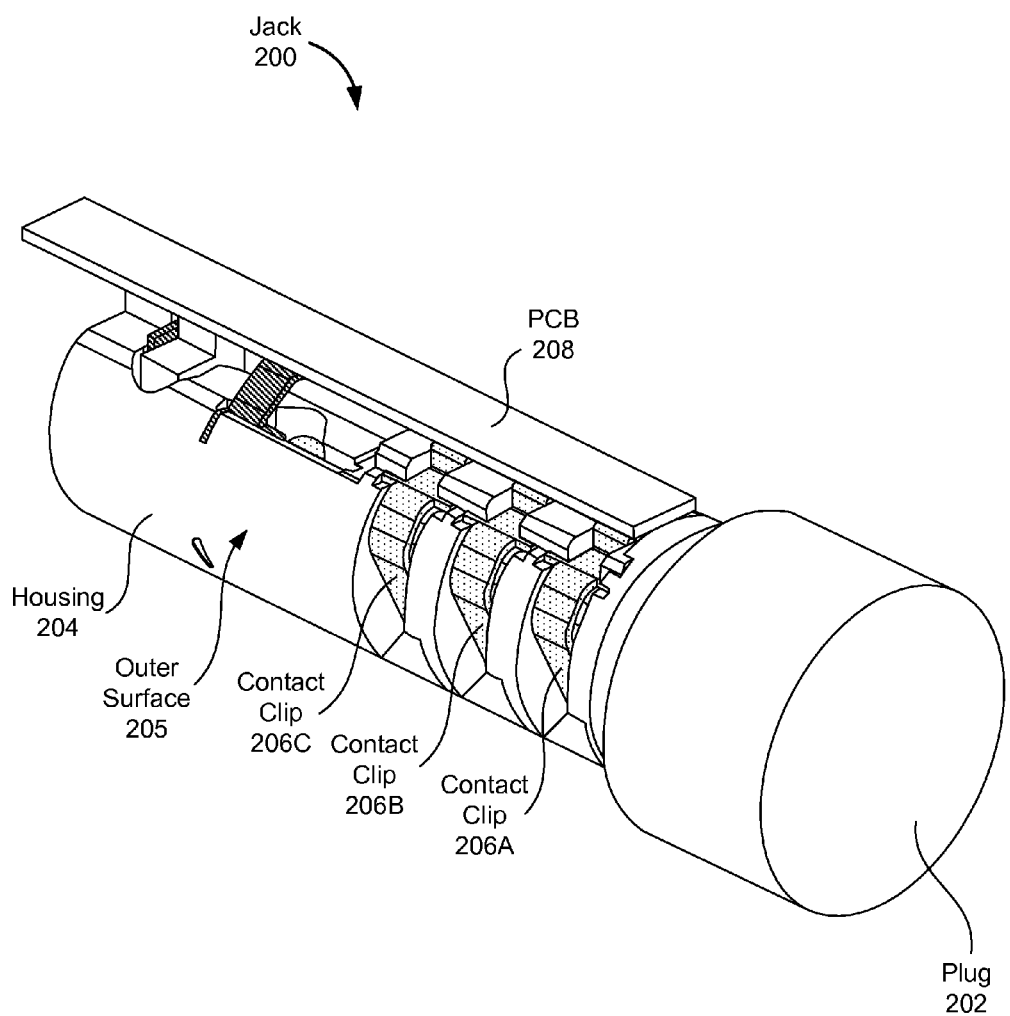
FIG. 2A is a perspective view of a jack.

FIG. 2A is a perspective view of a jack 200 according to an example embodiment. The jack 200 may include an audio jack that carries electronic signals representing audio input and/or output. The jack 200 may be inserted into the recess 114 (shown in FIG. 1). The jack 200 may, when inserted into the recess 114, couple with the electrical contacts included in or adjacent to the recess 114, carrying electrical signals between the electronic components included in the base 102 (shown in FIG. 1) and the electronic device outside the laptop compute 100.

The jack 200 may include a housing 204. The housing 204 may be made of an insulative material, such as plastic. The housing 204 may be generally cylindrical, with apertures that receive components and a cylindrical cavity (not shown in FIG. 2A) that receives a plug. The housing 204, being generally cylindrical, may have a cross section that is bounded by an imaginary cylinder having a diameter, D, such that any dimension of the housing 204 transverse to the axis of the housing is less than or equal to D, thus allowing the housing 204 to fit into the recess 114. The generally cylindrical shape of the housing 204 may cause a majority of an outer surface 205 of the housing 204 to be adjacent to, and/or contiguous with, the imaginary cylinder. The adjacency of the majority of the outer surface 205 of the housing 204 to the imaginary cylinder may cause the majority of the outer surface 205 of the housing 204 to be within a small distance of the imaginary cylinder. The small distance may be, for example one-tenth of a millimeter (0.1 mm), or one percent (1%), two percent (2%), three percent (3%), four percent (4%), or five percent (5%), of the diameter of the housing 204 and/or of the diameter of the imaginary cylinder.

The imaginary cylinder that the housing 204 is bounded by may have a diameter equal to or greater than the diameter of the recess 114. The imaginary cylinder may, for example, have a diameter of no more than 6.4 millimeters, and/or less than 6.4 millimeters. The 6.4 millimeter diameter may be a maximum size of the recess 114 that allows the hinge 106 (shown in FIG. 1) to have sufficient strength not to break without increasing a size of the hinge 106 to an undesirable size. The closeness, adjacency, and/or contiguity of the outer surface 205 of the housing 204 to the imaginary cylinder, which may correspond to and/or be equivalent to the recess 114, may enable the housing 204 to be friction-fitted into the recess 114.

The jack 200 may receive a plug 202. The plug 202 may include, for example, an audio pin or other electrical component that sends and/or receives electrical signals to and from the laptop computer 100 (shown in FIG. 1). The plug 202 may extend into a cavity (not shown in FIG. 2A) defined by the housing 204.

The jack 200 may include contact clips 206A, 206B, 206C. The contact clips 206A, 206B, 206C may include at least one contact clip and/or may include a first contact clip 206A, a second contact clip 206B, and a third contact clip 206C. The contacts clips 206A, 206B, 206C may be made of a conductive material, such as metal. The contact clips 206A, 206B, 206C may extend through contact apertures (referenced in subsequent figures) defined by the housing 204 and into the cavity defined by the housing 204.

The contact clips 206A, 206B, 206C may be friction-fitted into the contact apertures. The contact clips 206A, 206B, 206C may be friction-fitted into the contact apertures by flanges of the contact clips 206A, 206B, 206B being friction-fitted into slots defined by the contact apertures, and/or by an angle of extension of an arm of the contact clip 206A, 206B, 206B from a body of the contact clip 206A, 206B, 206C increasing when the contact clip 206A, 206B, 206C is inserted into the contact aperture. The contact clips 206A, 206B, 206C may contact portions of the plug 202 which send and receive electrical signals between the laptop computer 100 and a device coupled to the plug 202.

The jack 200 may include a printed circuit board (PCB) 208. The PCB 208 may include electrical contacts (shown in FIG. 4) coupled to the contact clips 206A, 206B, 206C, as well as to detection contacts (not shown in FIG. 2A). The PCB 208 may be flexible and/or include a flexible PCB, enabling the PCB 208 to bend and/or depress when the jack 200 is inserted into the recess 114. When the jack 200 is outside the recess 114, the PCB 208 may extend beyond the imaginary cylinder that bounds the housing 204. The bending and/or depressing of the PCB 208 may cause the PCB 208 to stay within the imaginary cylinder and/or recess 114 when the jack 200 is inside the recess 114.

Figure 2B:
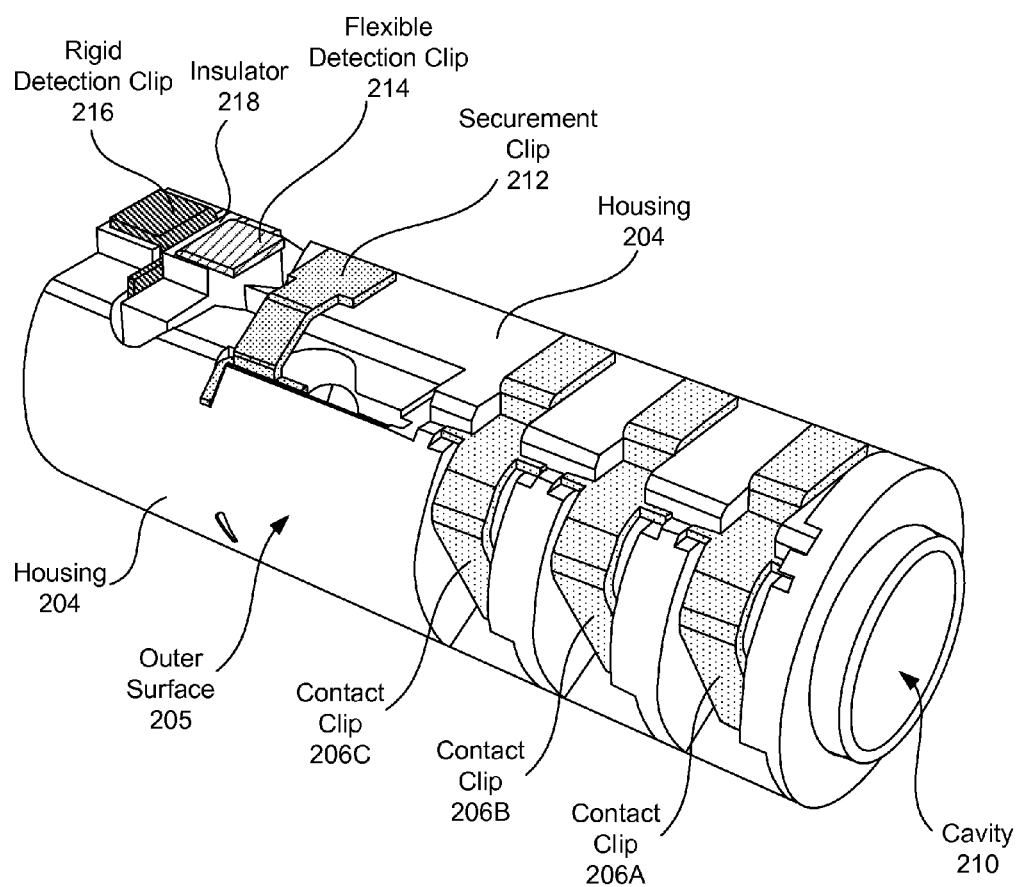
FIG. 2B is a diagram showing the jack without a printed circuit board (PCB).

FIG. 2B is a diagram showing the jack 200 without the PCB 208. As shown in FIG. 2B, the housing 204 of the jack 200 may define a cavity 210. The cavity 210 may be cylindrical, and may include an opening at a first end (referenced in FIG. 2C) of the housing 204, and may be closed at a second end (shown in FIG. 2C) of the housing 204. The cavity 210 may receive the plug 202 (not shown in FIG. 2B).

The jack may include a securement clip 212. The securement clip 212 may be made of either an insulative material or a conductive material. The securement clip 212 may be made of a rigid yet flexible material, such as metal. The securement clip 212 may extend through the housing 204, and through a securement aperture defined by the housing 204, into the cavity 210.

The securement clip 212 may be configured to bend toward the outer surface 205 of the housing 204, and/or reduce a radius of curvature of a rounded portion (shown in FIGS. 5A, 5B, 5C, and 5D), in response to the cavity 210 receiving the plug 202. The securement clip 212 may press away from the outer surface 205 and into the cavity 210 against the plug 202, thereby securing the plug 202 in the cavity 210 by a friction fit.

The jack 200 may also include a flexible detection clip 214 extending from outside the housing 204 through a flexible detection aperture into the cavity 210. The flexible detection clip 214 may be made of a conductive material, such as metal. The jack 200 may also include a rigid detection clip 216 extending through a rigid detection aperture from outside the housing 204 into the cavity 210. The rigid detection clip 216 may be made of a conductive material, such as metal.

The flexible detection clip 214 may, in response to the plug 202 being inserted into the cavity 210, bend away from the first end of the jack 200, reducing a radius of curvature of a rounded portion (shown in FIGS. 6A, 6B, 6C, 6D, and 6E) of the flexible detection clip 214, and make contact with the rigid detection clip 216. The contacting of the rigid detection clip 216 by the flexible detection clip 214 may electrically couple the flexible detection clip 214 to the rigid detection clip 216.

The PCB 208 (not shown in FIG. 2B) may include a plug inserted circuit. The plug inserted circuit may detect when the flexible detection clip 214 and the rigid detection clip 216 are electrically coupled together. The PCB 208 may, in response to determining that the flexible detection clip 214 and rigid detection clip 216 are electrically coupled to each other, send a plug inserted signal to a device, such as a device or component included in the laptop computer 100 (such as the processor 116), indicating that the plug 202 has been inserted in the cavity 210 of the jack 200.

The housing 204 may also include an insulator 218. The insulator 218 may be a piece of material included in the housing 204, which is located between, and/or disposed between, the flexible detection clip 214 and the rigid detection clip 216. Insulator 218 may ensure that the flexible detection clip 214 and the rigid detection clip 216 are not electrical coupled until after the plug 202 has been inserted into the cavity 210.

Figure 2C:
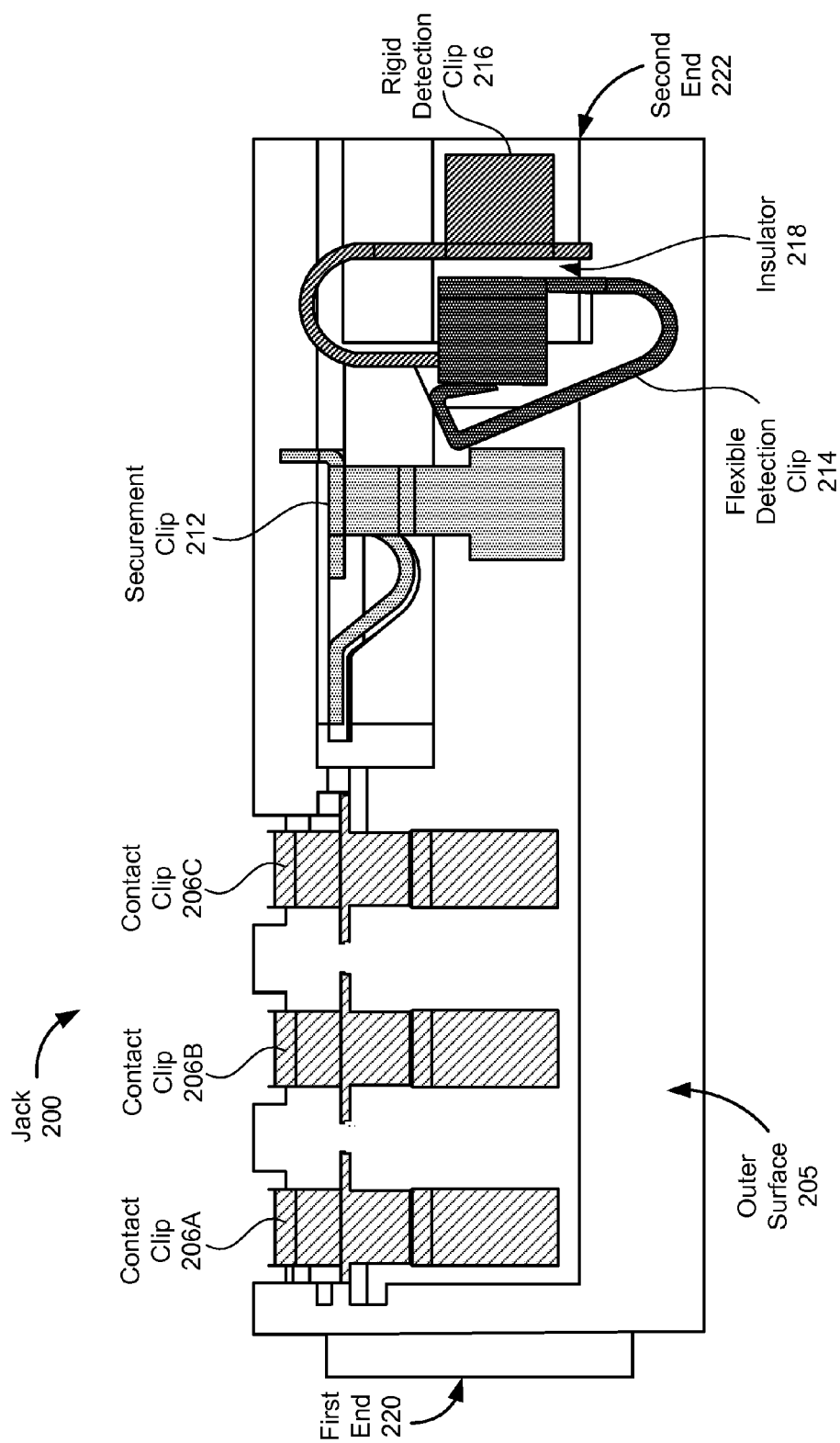
FIG. 2C is another diagram showing the jack.

FIG. 2C is another diagram showing the jack 200. The first contact clip 206A may be closer to the first end 220 than the second contact clip 206B, third contact clip 206C, securement clip 212, flexible detection clip 214, and rigid detection clip 216. The second contact clip 206B may be closer to the first end 220 than the third contact clip 206C, securement clip 212, flexible detection clip 214, and rigid detection clip 216. The third contact clip 206C may be closer to the first end 220 than the securement clip 212, flexible detection clip 214, and rigid detection clip 216. The securement clip 212 may be closer to the first end 220 than the flexible detection clip 214 and rigid detection clip 216. The flexible detection clip 214 may be closer to the first end 220 than the rigid detection clip 216. This is merely an example. The components of the jack 200 may be arranged in any order.

As shown in FIG. 2C, the flexible detection clip 214 is located near the rigid detection clip 216. In response to the plug 202 being inserted into the first end 220, the flexible detection clip 214 will bend toward the second end 222, reducing a radius of curvature of a rounded portion (referenced in FIGS. 6A, 6B, 6C, 6D, and 6E) of the flexible detection clip 214 until the flexible detection clip 214 contacts the rigid detection clip 216. When the plug 202 is inserted into the first end 220, the rounded portion of the securement clip 212 will bend toward the portion of the housing 204 closer to the top of the page and press back toward the plug 202, securing the plug 202 in the jack 200 by a friction fit.

Figure 2D:
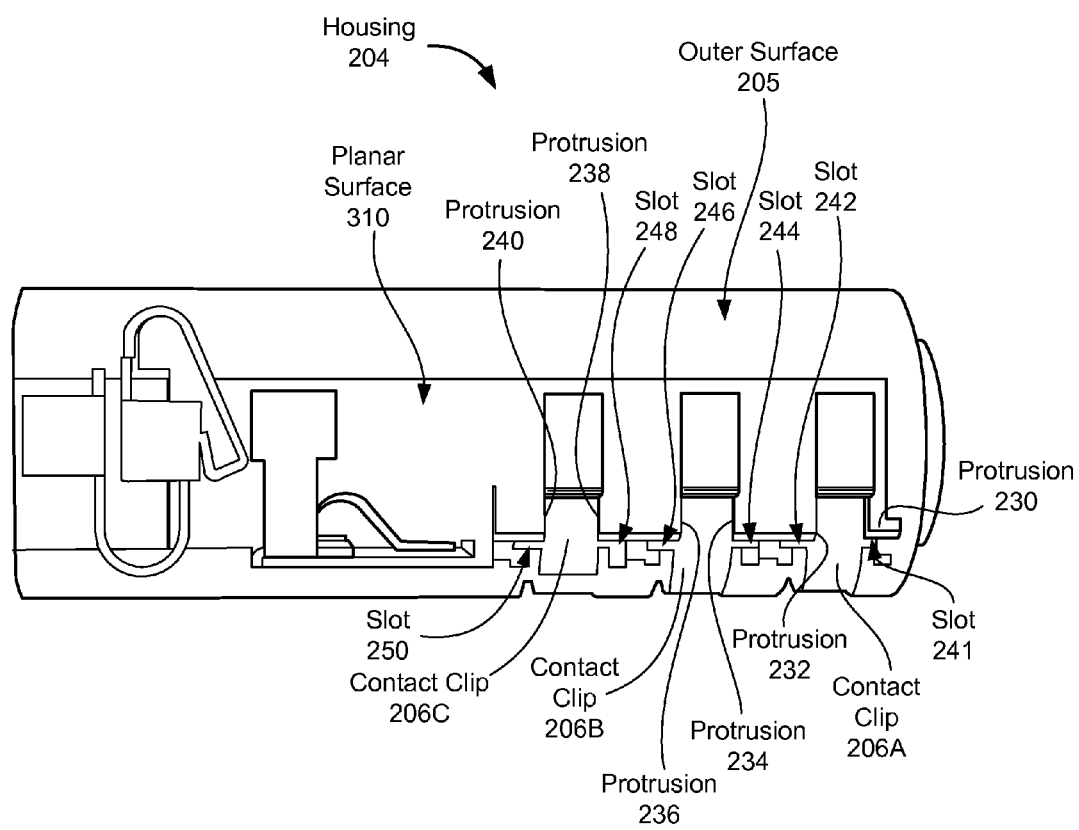
FIG. 2D is a diagram showing a housing included in the jack.

FIG. 2D is a diagram showing the housing 204. As shown in FIG. 2D, the housing 204 includes a planar surface 310 portion. The planar surface 310 may receive the flexible PCB 208, and/or the flexible PCB 208 may rest on the planar surface 310.

The contact apertures (not referenced in FIG. 2D) that receive the contact clips 206A, 206B, 206C may include and/or define slots 241, 242, 244, 246, 248, 250. Protrusions 230, 232, 234, 236, 238, 240 of the housing 204 may define the slots, 241, 242, 244, 246, 248, 250. The slots 241, 242, 244, 246, 248, 250 may receive flanges (shown in FIGS. 8B and 8C) of the contact clips 206A, 206B, 206C. The receipt of the flanges by the slots 241, 242, 244, 246, 248, 250, and/or insertion of the flanges into the slots 241, 242, 244, 246, 248, 250, may secure the contact clips 206A, 206B, 206C into the housing 204 by friction-fitting the flanges into the slots 241, 242, 244, 246, 248, 250.

Figure 2E:
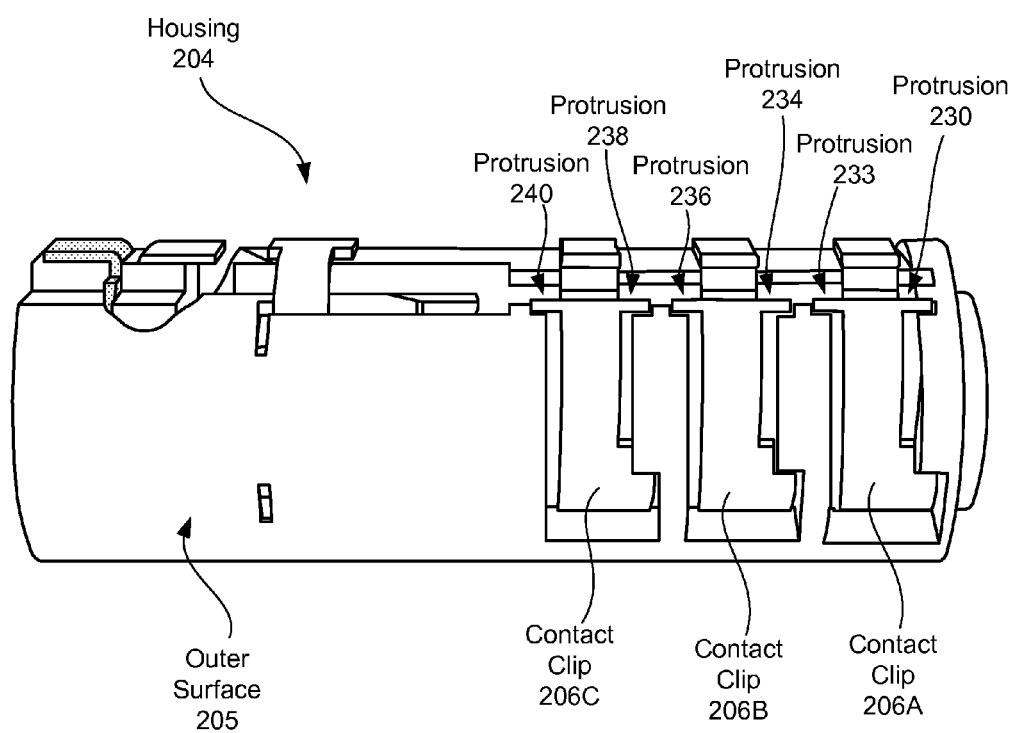
FIG. 2E is another diagram showing the housing.

FIG. 2E is another diagram showing the housing 204. FIG. 2E shows the protrusions 230, 232, 234, 236, 238, 240 which define the slots 241, 242, 244, 246, 248, 250 (the slots are not referenced in FIG. 2E).

Figure 2F:
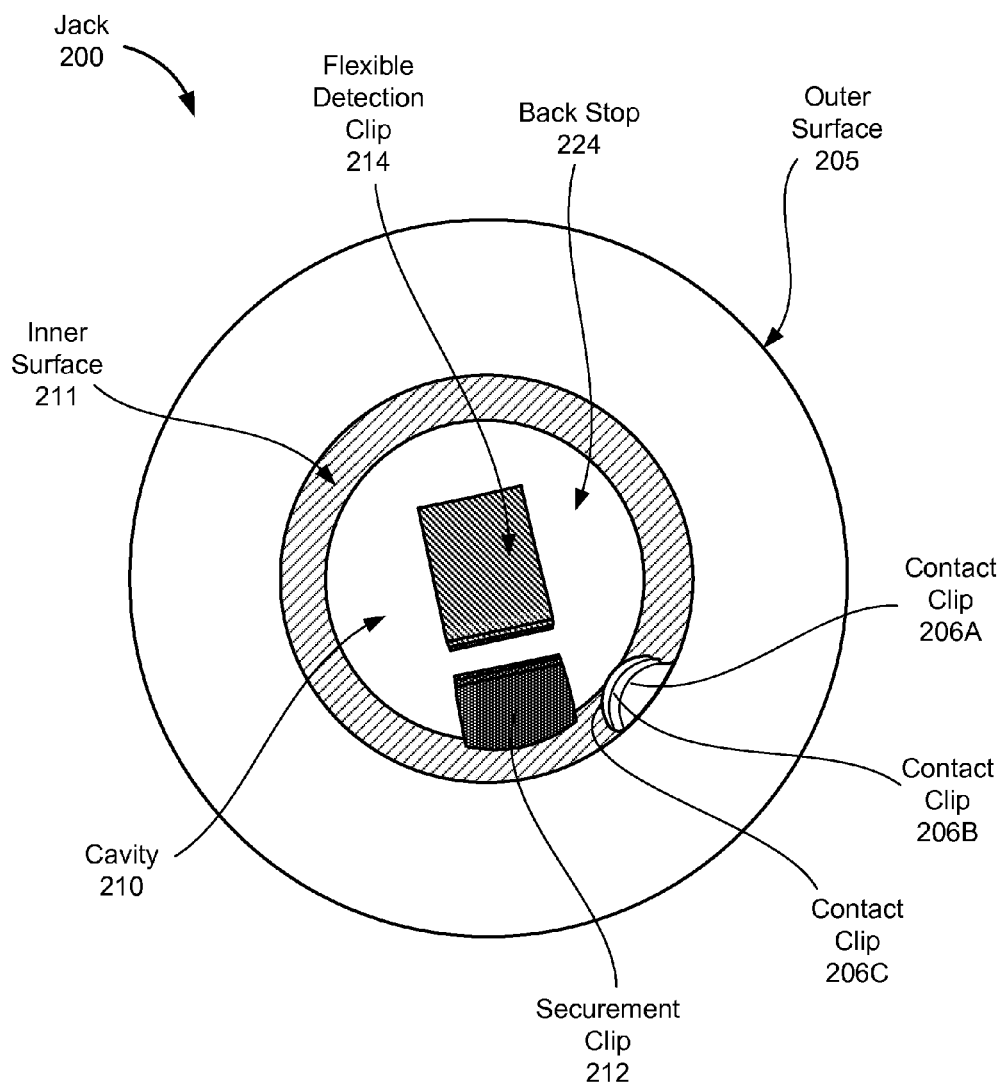
FIG. 2F is a diagram of the jack viewed from a first end.

FIG. 2F is a diagram of the jack 200 viewed from the first end 220 (not referenced in FIG. 2F). As shown in FIG. 2F, the securement clip 212 extends through an aperture (not referenced in FIG. 2F) in an inner surface 211 of the housing 204 and into the cavity 210. The flexible detection clip 214 also extends into the cavity 210. The contact apertures (not shown in FIG. 2F) make room for protrusions on the contact clips 206A, 206B, 206C. The contact clips 206A, 206B, 206C extend into the cavity 210 so that protrusions of the contact clips 206A, 206B, 206C may contact portions of the plug 202 (not shown in FIG. 2F).

Figure 2G:
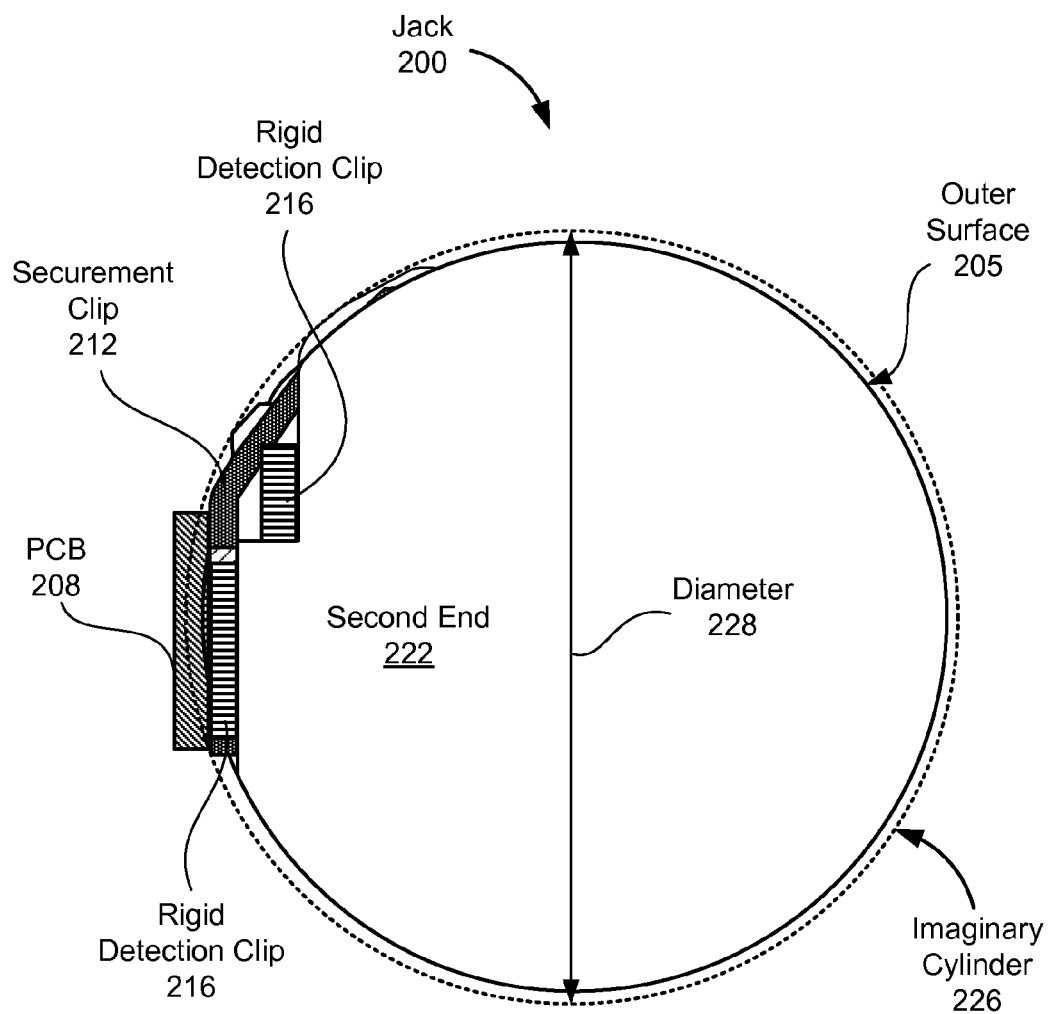
FIG. 2G is another diagram of the jack.

FIG. 2G is another diagram of the jack 200. The imaginary cylinder 226 may have a diameter 228 equal to or slightly greater than the diameter of the housing 204 of the jack 200. The diameter of the imaginary cylinder 226 may, for example, be no more than one millimeter greater, one percent greater than the diameter of the housing tool, two percent greater, three percent greater, four percent greater, and/or five percent greater than the diameter of the housing 204, according to various example embodiments. Components of the jack 200, including some, all, or any combination of the PCB 208, contact clips 206A, 206B, 206C, securement clip 212, flexible detection clip 214, and/or rigid detection clip 216, may extend beyond the imaginary cylinder 226 (while the housing 204 is bounded by the imaginary cylinder 226), or all of the components of the jack 200 may be bounded by the imaginary cylinder 226.

Figure 3A:
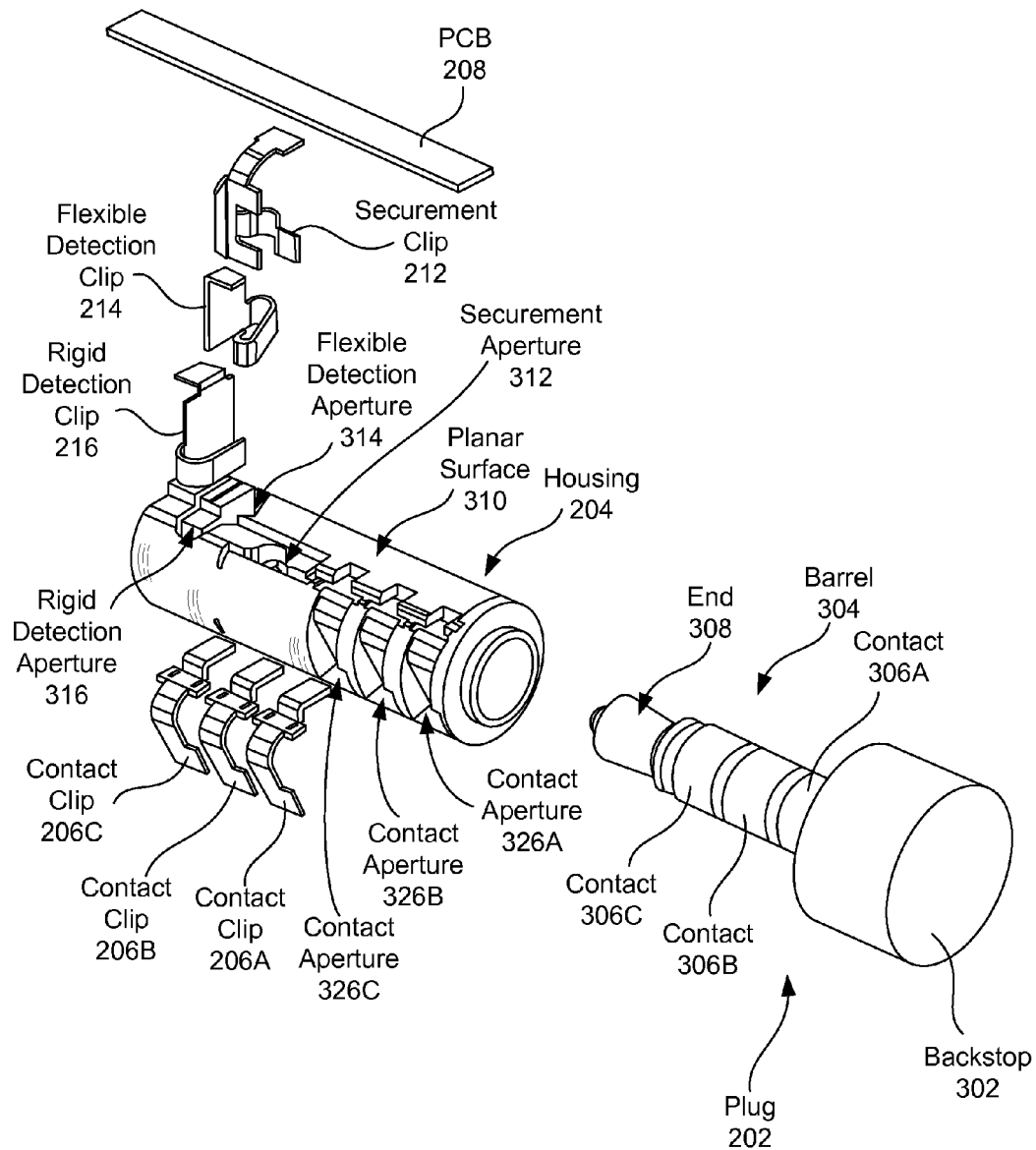
FIG. 3A shows an exploded view of the jack and a plug.

FIG. 3A shows an exploded view of the jack 200 and plug 202. The plug 202 may include a backstop 302 connected to a barrel 304. The backstop 302 may be cylindrical, and/or the barrel 304 may be cylindrical. The backstop 302 may have a greater diameter than the barrel 304. The greater diameter of the backstop 302 may prevent the plug 202 from being inserted into the cavity 210 beyond a predetermined distance. The backstop 302 may be coupled to another device, such as headphones, a speaker, and/or a microphone.

The barrel of the plug 202 may include one or more, such as three, contacts 306A, 306B, 306C. The contacts 306A, 306B, 306C may be electrically isolated from each other, and may carry separate signals. The contacts 306A, 306B, 306C may contact the contact clips 206A, 206B, 206C, respectively. The barrel 304 may also include an end 308. The end 308 may contact the flexible detection clip 214, pressing the flexible detection clip 214 and causing the flexible detection clip 214 to contact the rigid detection clip 216.

The housing 204 may define contact apertures 326A, 326B, 326B which receive the contact clips 206A, 206B, 206C and extend from the outer surface 205 of the housing 204 to the cavity 210. The housing 204 may define a securement aperture 312 that receives the securement clip 212 and extends from the outer surface 205 of the housing 204 into the cavity 210. The housing 204 may define a flexible detection aperture 314 which receives the flexible detection clip 214 and extends from the outer surface 205 of the housing 204 to the cavity 210. The housing 204 may define a rigid detection aperture that receives the rigid detection clip 216 and extends from the outer surface 205 of the housing 204 to the cavity 210.

Figure 3B:
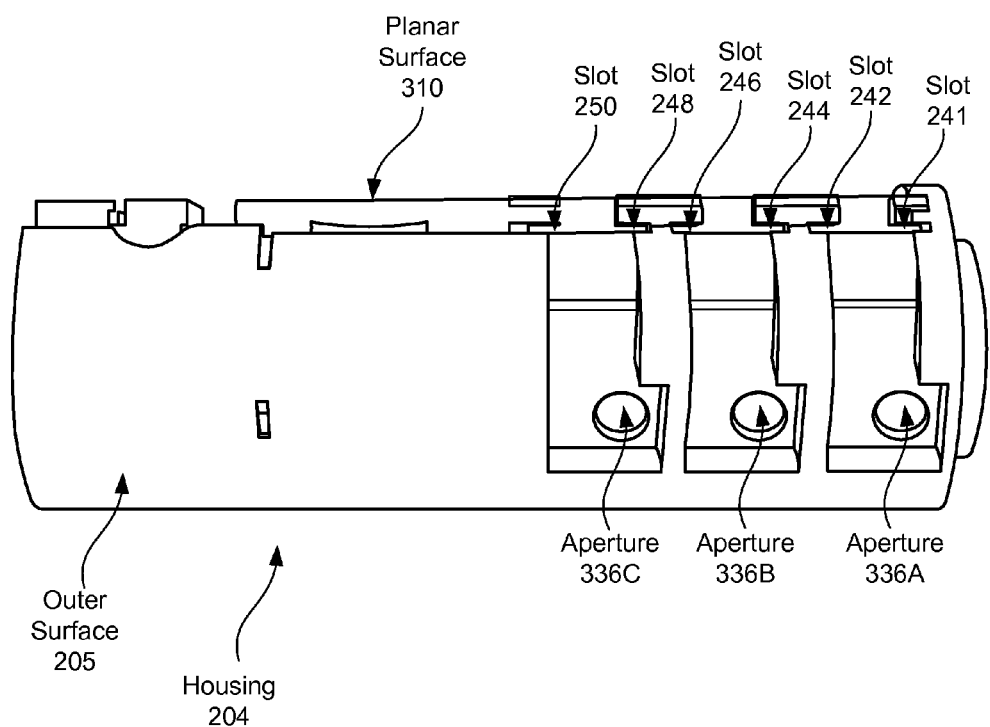
FIG. 3B is a diagram showing the housing.

FIG. 3B is a diagram showing the housing 204. As shown in FIG. 3B, the contact apertures 326A, 326B, 326C may include circular, elliptical, and/or rounded apertures 336A, 336B, 336C. The circular, elliptical, and/or rounded apertures 336A, 336B, 336C may allow the protrusions (shown but not referenced) of the contact clips 206A, 206B, 206C to extend through the housing 204 into the cavity 210.

As discussed above, the protrusions 230, 232, 234, 236, 238, 240 (shown but not referenced in FIG. 3B) of the housing 204 may define the slots 241, 242, 244, 246, 248, 250 which receive the flanges of the contact clips, 206A, 206B, 206C, thereby friction fitting the contact clips 206A, 206B, 206C into the housing 204.

Figure 3C:
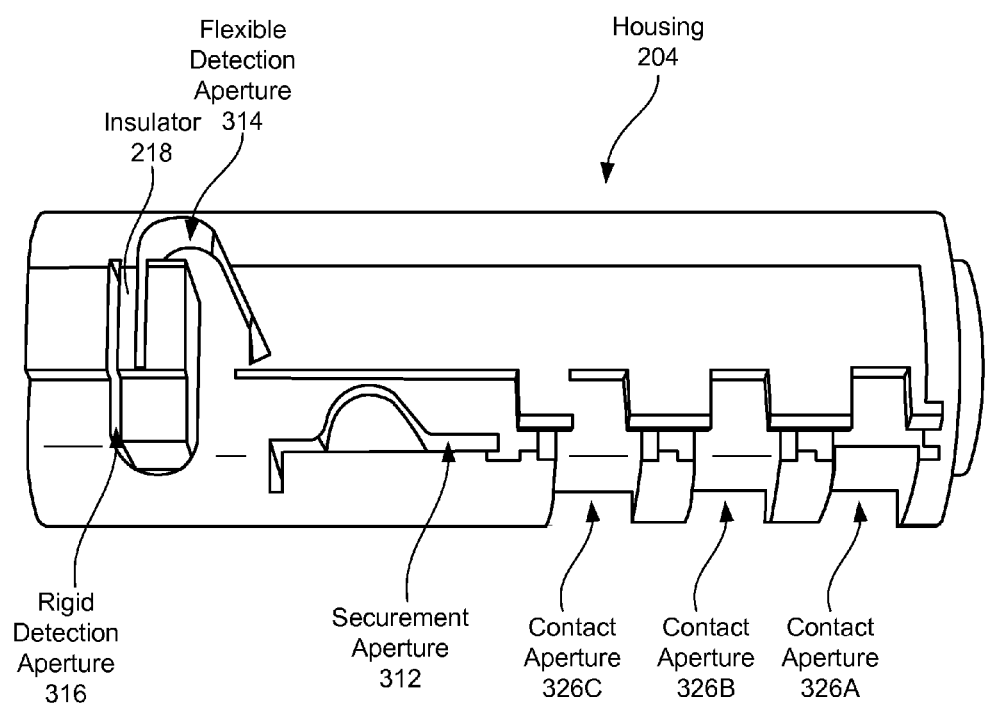
FIG. 3C is another diagram of the housing.

FIG. 3C is another diagram of the housing 204. The contact apertures 326A, 326B, 326C may receive the contact clips 206A, 206B, 206C (not shown in FIG. 3C). Securement aperture 312 may receive the securement clip 212 (not shown in FIG. 3C). Flexible detection aperture 314 may receive the flexible detection clip 214 (not shown in FIG. 3C). Rigid detection aperture 316 may receive the rigid detection clip 216 (not shown in FIG. 3C). Insulator 218, which may be a portion of the housing 204, may be disposed between the flexible detection aperture 314 and the rigid detection aperture 316.

Figure 4:
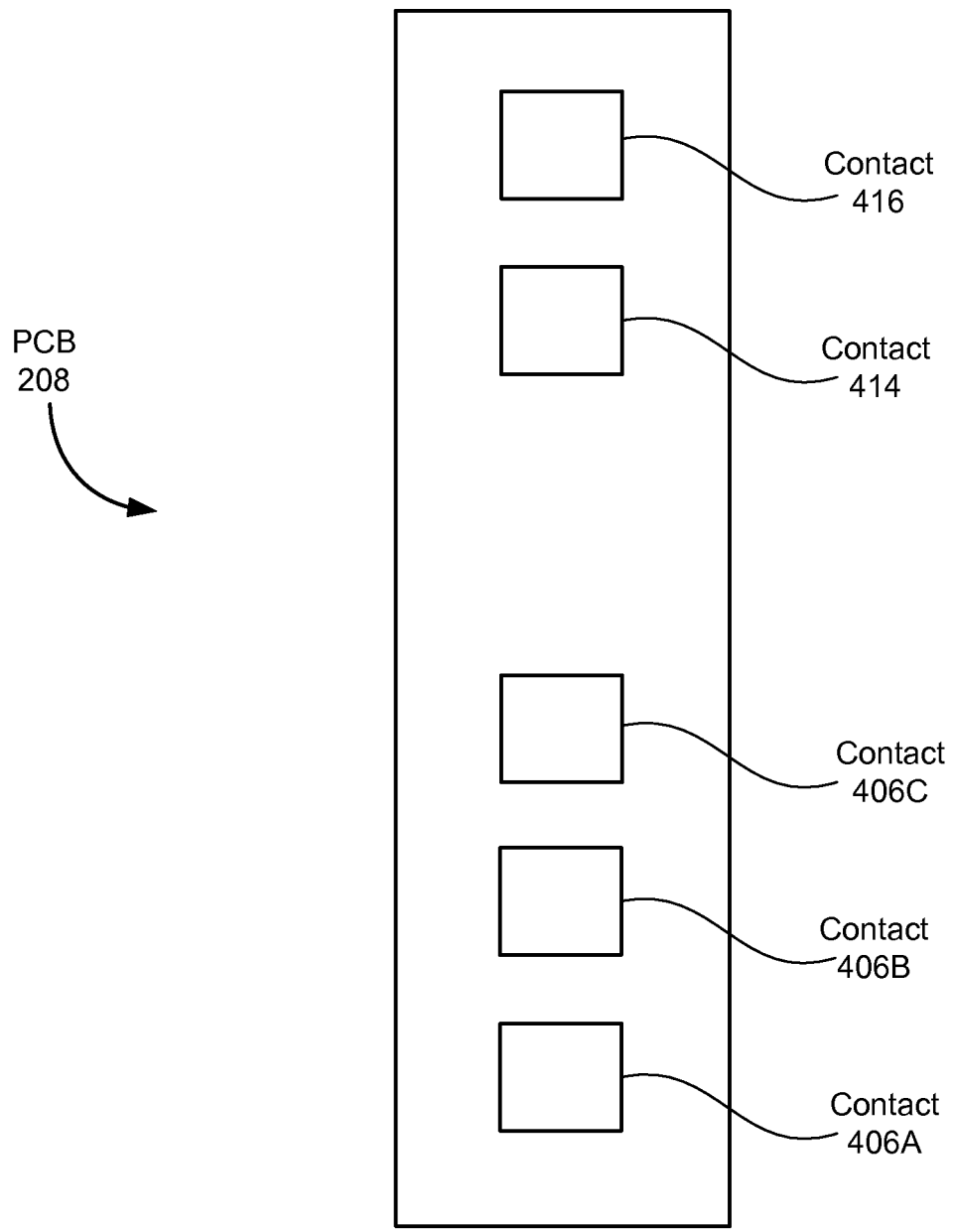
FIG. 4 is a diagram of the PCB.
Figure 5A:
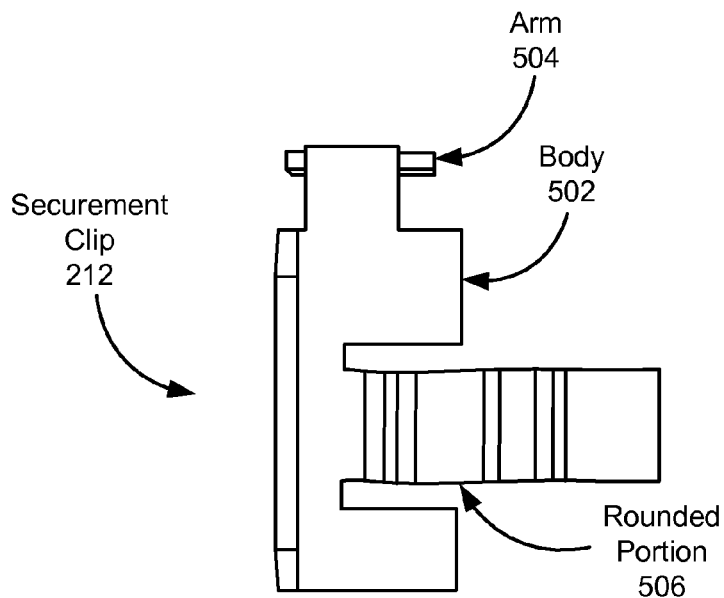
FIGS. 5A, 5B, 5C, and 5D are diagrams of a securement clip included in the jack.
Figure 5B:
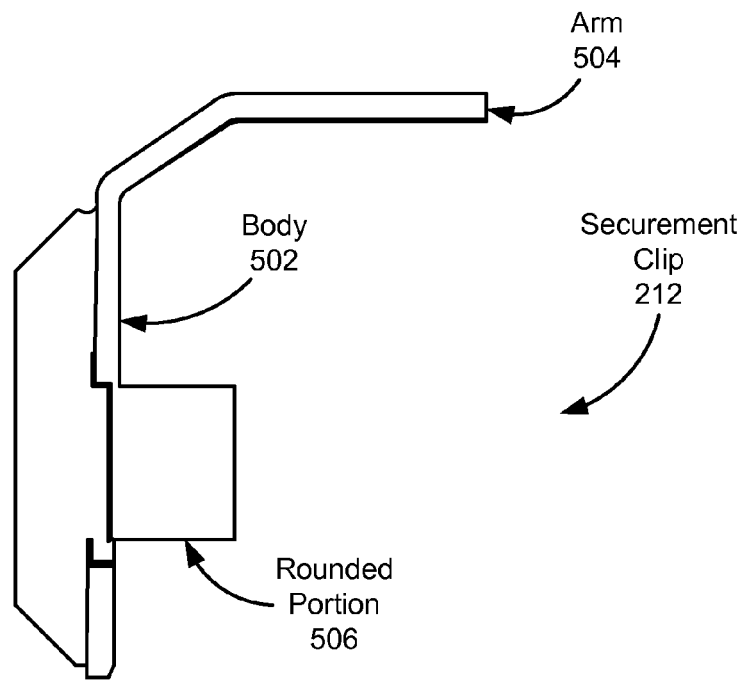
Figure 5C:
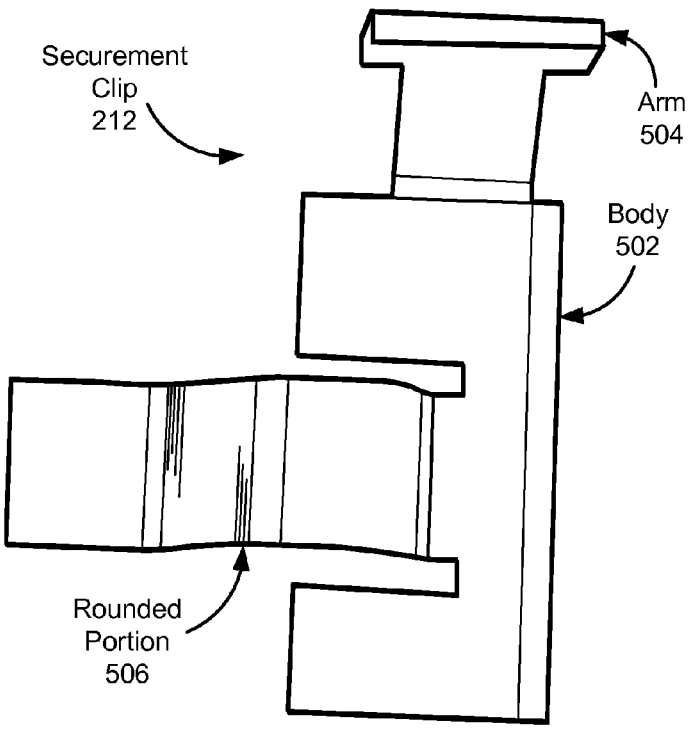
Figure 5D:
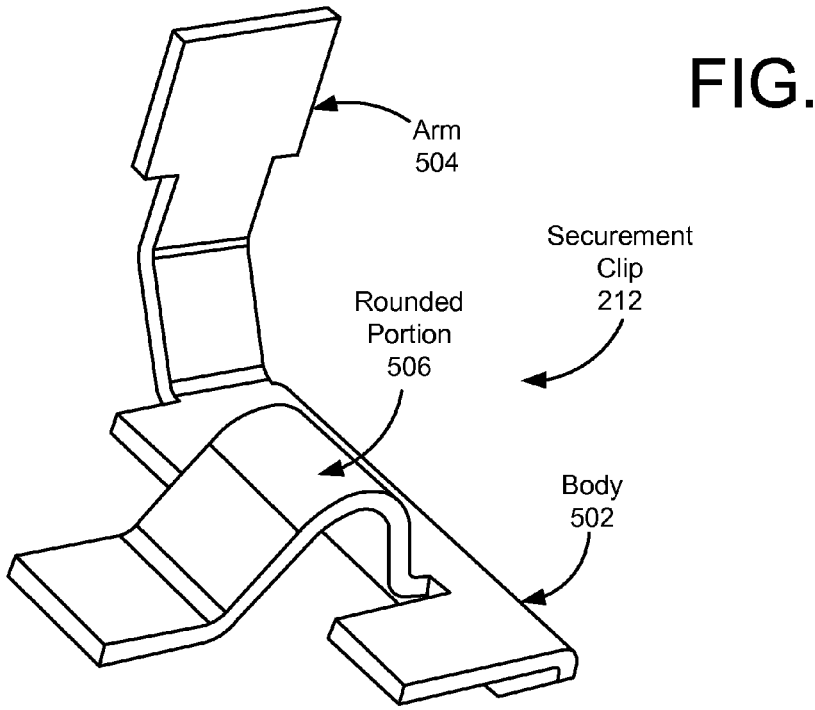
Figure 6A:
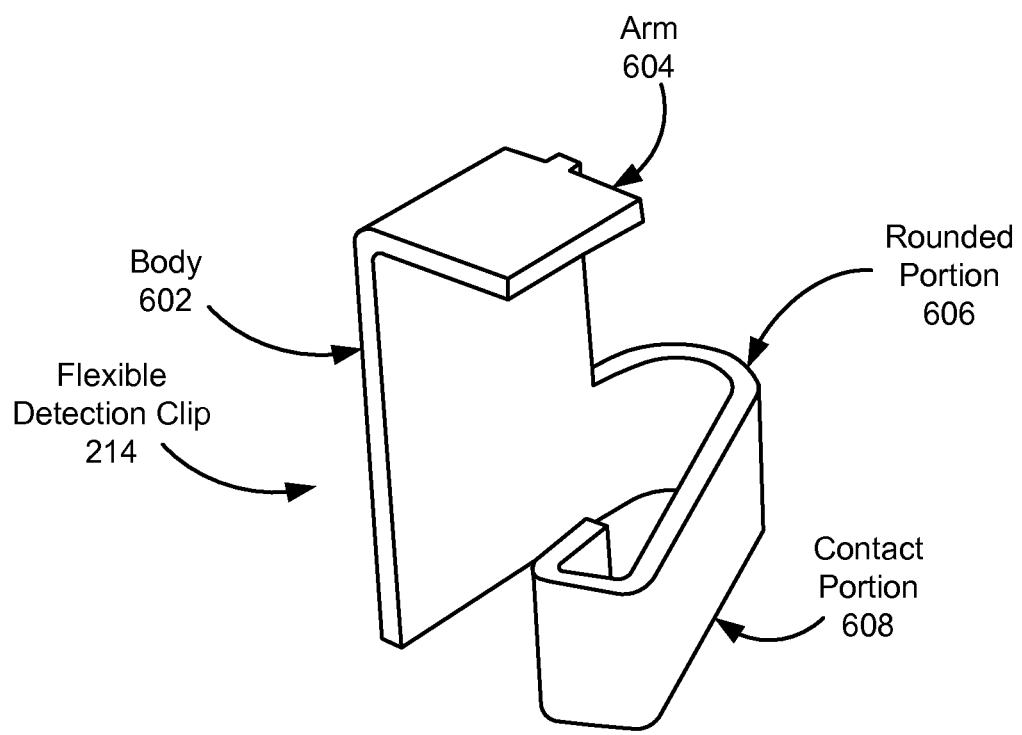
Figure 6D:
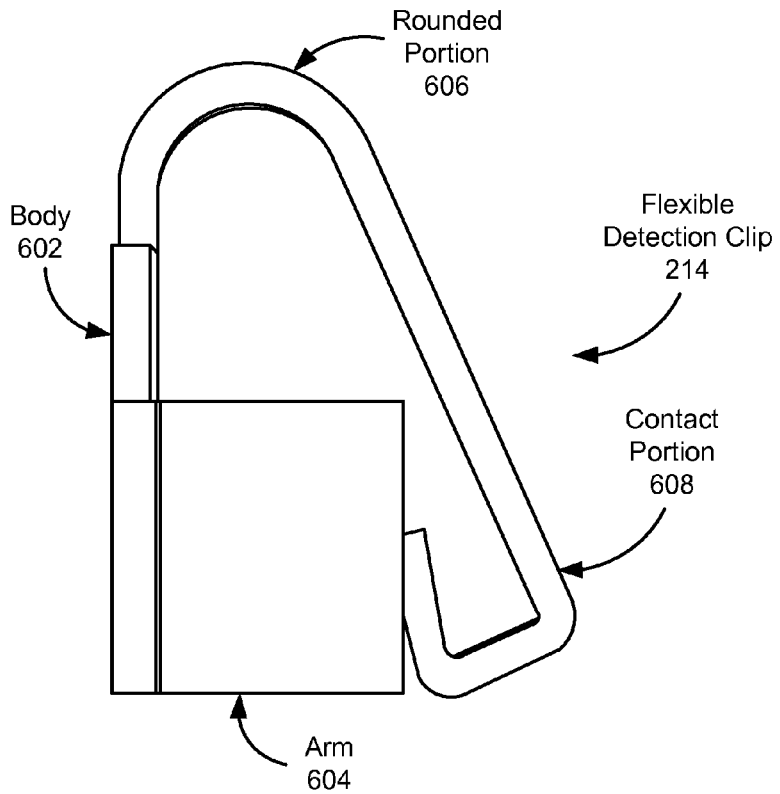
Figure 6E:
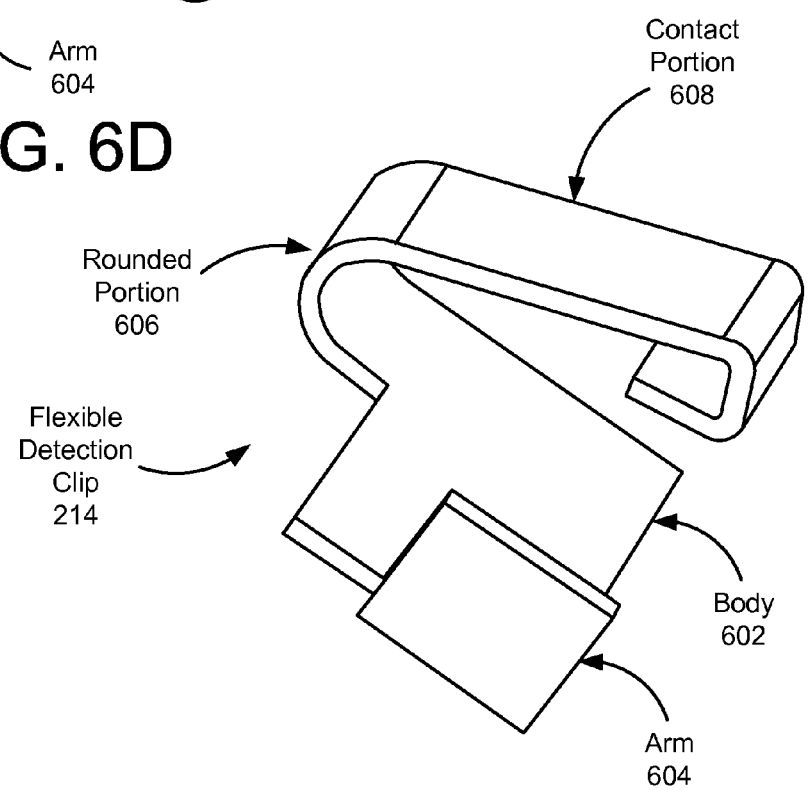

FIG. 4 is a diagram of the PCB 208. The PCB 208 may include contacts 406A, 406B, 406C, which contact and/or are electrically coupled with the contact clips 206A, 206B, 206C (not shown in FIG. 4) when the PCB 208 is placed on the planar surface 310 (not shown in FIG. 4) of the housing 204. The contacts 406A, 406B, 406C may route signals from the contacts 306A, 306B, 306C (not shown in FIG. 4) of the plug 202 (not shown in FIG. 4), through the contact clips 206A, 206B, 206C (not shown in FIG. 4), to electrical components such as the processor 116 included in the base 102 of the laptop computer 100.

The PCB 208 may also include contact 414 that contacts the flexible detection clip 214 (not shown in FIG. 4), and contact 416 that contacts the rigid detection clip 216 (not shown in FIG. 4). The contacts 414, 416 may be included in a plug inserted circuit that detects whether the flexible detection clip 214 and rigid detection clip 216 are electrically coupled to each other and provide an indication of whether plug 202 has been inserted into the cavity 210.

FIGS. 5A, 5B, 5C, and 5D are diagrams of the securement clip 212. As shown in the figures, the securement clip 212 may include a planar body 502. An arm 504 may extend from the body 502. The arm 504 may be planar and/or have a planar portion. The arm 504 may extend from the body 502 at a right angle, and/or may have a portion which extends along a plane that is a right angle from the body 502. The arm 504 may have a portion which extends along a plane, which is approximately perpendicular to a plane of the body 502, such as between 85° and 95° from, the plane of the body 502. The securement clip 212 may include a rounded portion 506. Rounded portion 506 may extend from the body 502. The rounded portion 506 may be round, and may be configured to bend in response to the cavity 210 (not shown in FIG. 5A, 5B, 5C, or 5D) receiving the plug 202 (not shown in FIG. 5A, 5B, 5C, or 5D). A radius of curvature of the rounded portion 506 may be reduced and/or become smaller when the cavity 210 receives the plug 202 and the plug 202 presses against the rounded portion 506. The rounded portion 506 may press back against the barrel 304 of the plug 202, providing a friction fit to the plug 202.

FIGS. 6A, 6B, 6C, 6D, and 6E are diagrams of the flexible detection clip 214. The flexible detection clip 214 may include a body 602. The body 602 may be planar. The flexible detection clip 214 may also include an arm 604. The arm 604 may contact the contact 414 (not shown in FIG. 6A, 6B, 6C, 6D, or 6E) of the PCB 208 (not shown in FIG. 6A, 6B, 6C, 6D, or 6E). The arm 604 may be planar, and/or may extend from the body 602. The arm 604 may extend from the body 602 at a right angle, or nearly a right angle. The arm 604 may, for example, extend along a plane which is between 85° and 95° from a plane along which the body 602 extends. The flexible detection clip 214 may include a rounded portion 606 and a contact portion 608. The rounded portion 606 may have a curved or rounded shape and may extend from the flexible detection clip 214. The contact portion 608 may extend from the rounded portion 606. Pressure from the plug 202 (not shown in FIG. 6A, 6B, 6C, 6D, or 6E) may cause a radius of curvature of the rounded portion 606 to become smaller, causing the contact portion 608 to move closer to the body 602. The movement of the contact portion 608 closer to the body 602 may cause the contact portion 608 to contact a portion of the rigid detection clip 216.

Figure 7A:
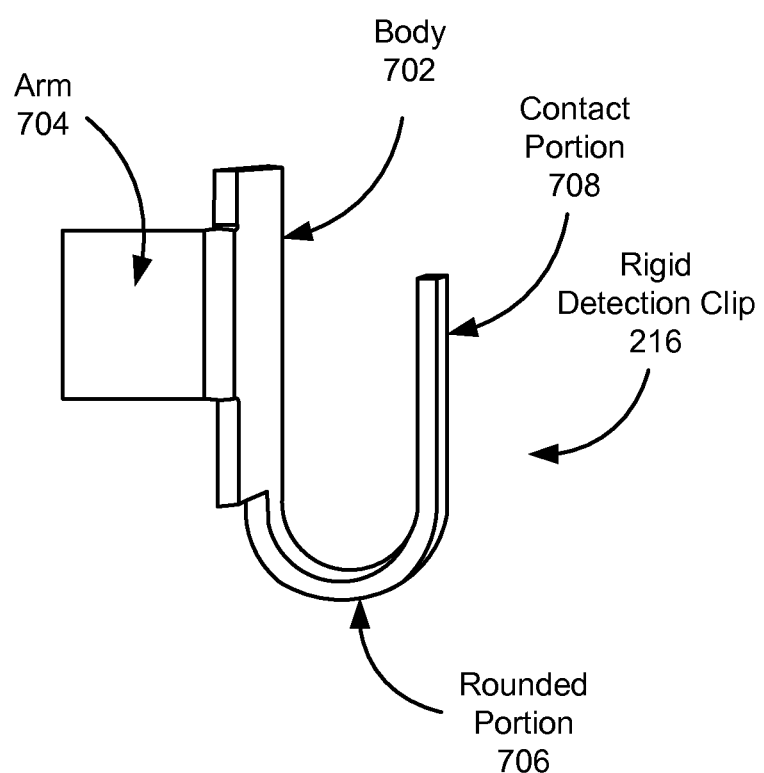
FIGS. 7A, 7B, and 7C are diagrams of a rigid detection clip included in the jack.
Figure 7B:
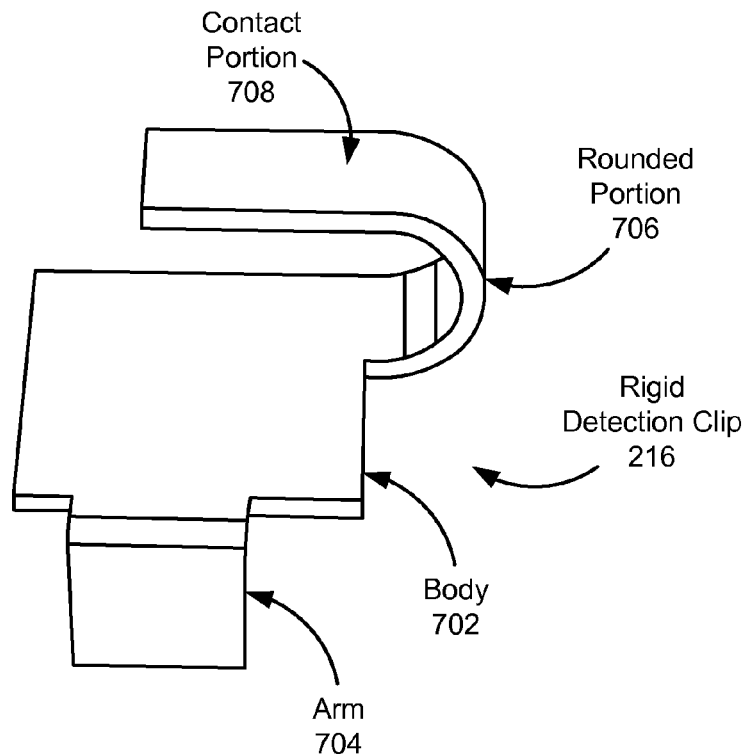
Figure 7C:
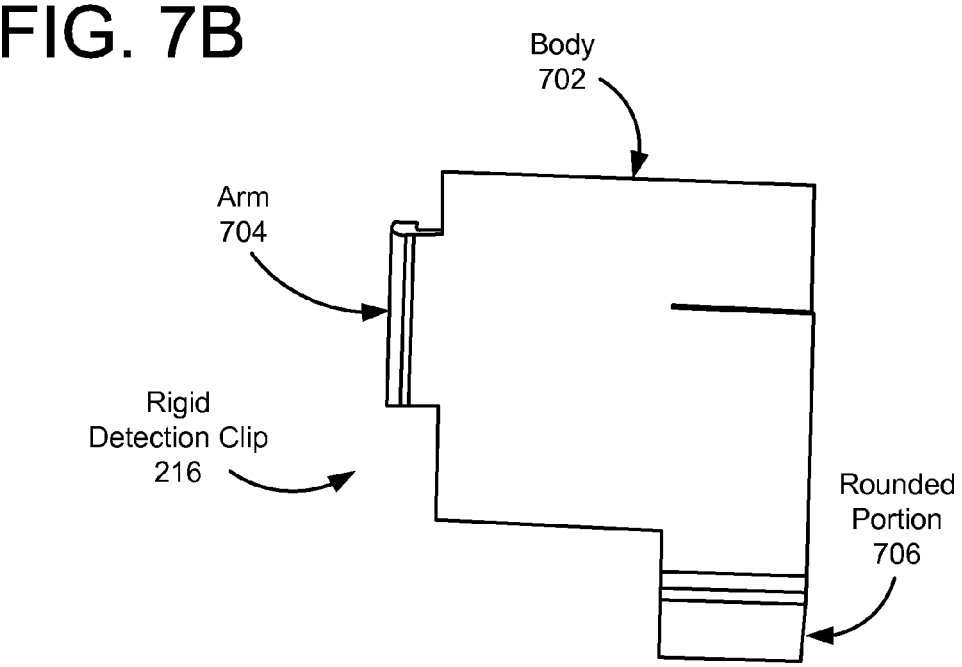

FIGS. 7A, 7B, and 7C are diagrams of the rigid detection clip 216. The rigid detection clip 216 may include a body 702. The body 702 may be planar. Rigid detection clip 216 may include an arm 704 extending from the body 702. The arm 704 may contact the contact 416 (not shown in FIG. 7A, 7B, or 7C) of the PCB 208 (not shown in FIG. 7A, 7B, or 7C). The arm 704 may be planar. The arm 704 may extend from the body 702 at a right angle, or approximately at a right angle, such as along a plane that is between 85° and 95° from a plane of the body 702. The rigid detection clip 216 may include a rounded portion 706 extending from the body 702. The rigid detection clip 216 may also include a contact portion 708. The contact portion 708 may extend from the rounded portion 706. The contact portion 708 may be planar. The contact portion 708 may be approximately parallel to the body 702. A plane along which the contact portion 708 extends may, for example, be within 5° of the plane along which the body 702 extends.

Figure 8A:
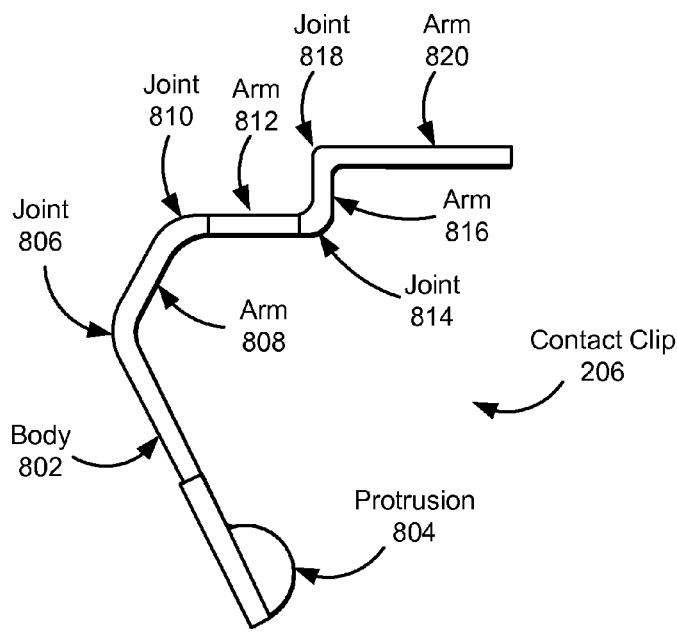
FIGS. 8A, 8B, and 8C are diagrams of a contact clip included in the jack.
Figure 8B:
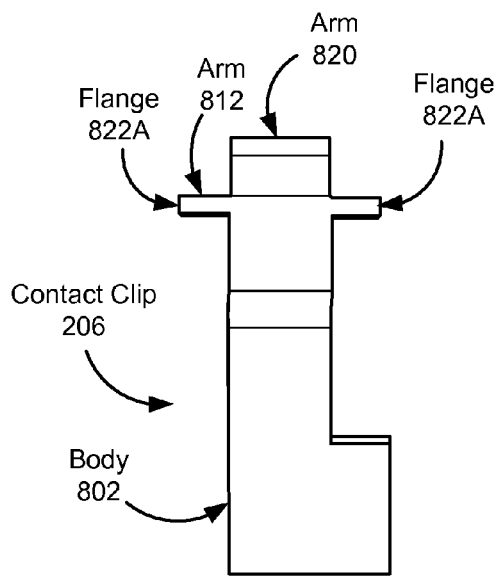
Figure 8C:
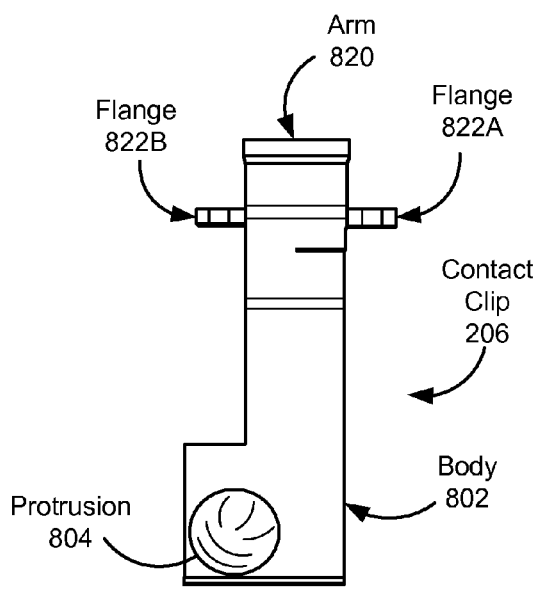
Figure 9A:
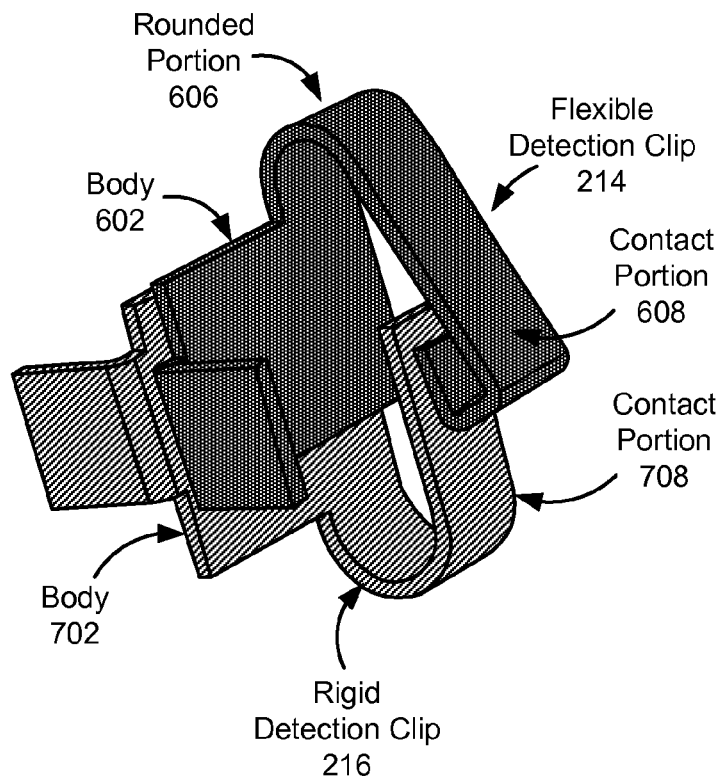
FIGS. 9A, 9B, 9C, and 9D show the arrangement of the flexible detection clip and the rigid detection clip with respect to each other when the flexible detection clip and rigid detection clip are inserted in the housing.
Figure 9B:
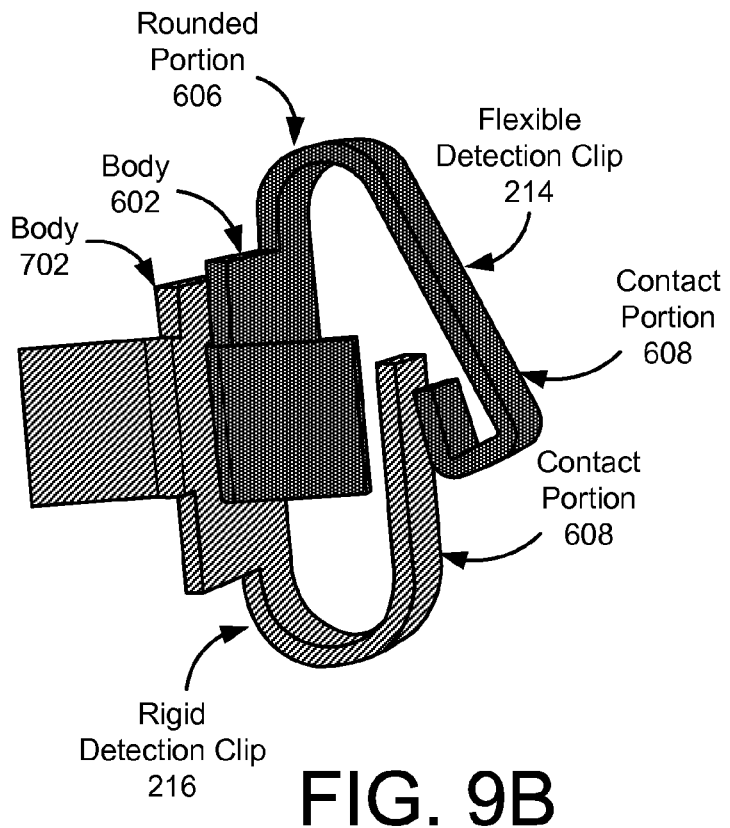
Figure 9C:
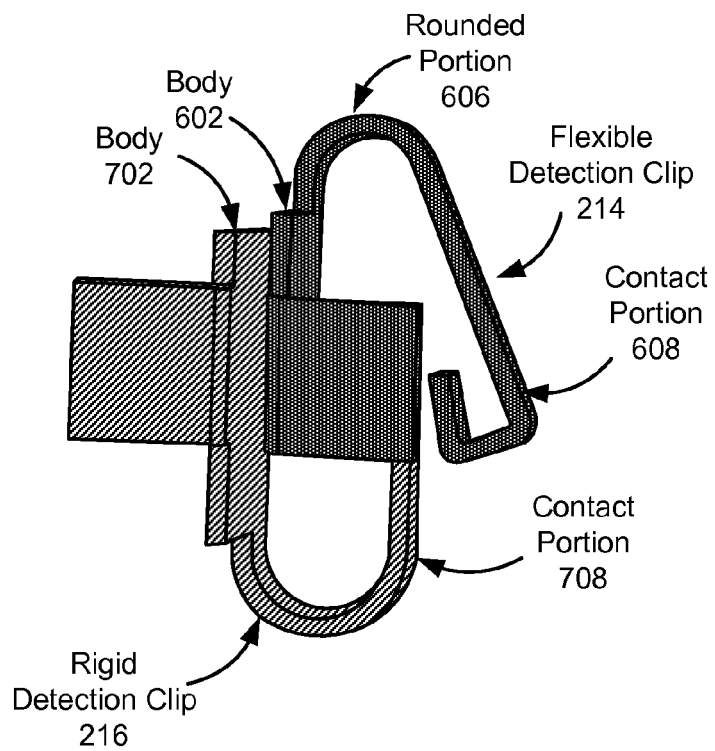
Figure 9D:
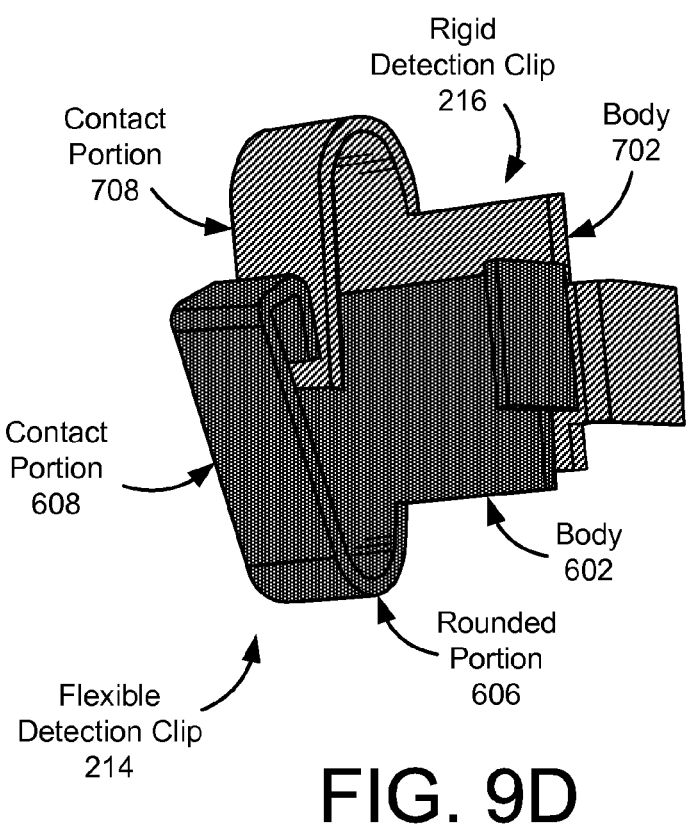

FIGS. 8A, 8B, and 8C are diagrams of a contact clip 206. Features described with respect to the contact clip 206 may be included in any of the contact clips 206A, 206B, 206C described above.

The contact clip 206 may include a body 802. The body 802 may be planar. The contact clip 206 may include a protrusion 804 extending from the body 802. The protrusion 804 may be rounded and/or convex. The protrusion 804 may extend through the aperture 336A, 336B, 336C (not shown in FIG. 8A, 8B, or 8C) into the cavity 210 (not shown in FIG. 8A, 8B, or 8C) and contact the respective contacts 306A, 306B, 306C (not shown in FIG. 8A, 8B, or 8C) of the plug 202.

The body 802 of the contact clip 206 may include an arm 808 extending from the body 802. A joint 806 may be disposed between the arm 808 and the body 802. The arm 808 may be planar and may extend along a plane that is between 30° and 60° from a plane along which the body 802 extends. The contact clip 206 may include another arm 812 extending from the arm 808. The contact clip 206 may include a joint 810 disposed between the arm 812 and arm 808. The arm 812 may extend away from the arm 808 at an angle of, for example, between 30° and 60°. The contact clip 206 may include another arm 816. The arm 816 may extend away from the arm 812. A joint 814 may be disposed between the arm 816 and the arm 812. The arm 816 may be approximately at a right angle from the arm 812. The arm 816 may, for example, extend along a plane that is between 85° and 95° from a plane along which the arm 812 extends. The contact clip 206 may also include an arm 820. The arm 820 may be planar, and may extend along a plane which is approximately a right angle, such as between 85° and 95°, of the plane along which the arm 816 extends.

The arm 812 may include flanges 822A, 822B. The flanges 822A, 822B may extend into, and/or be received by, the slots, 241, 242, 244, 246, 248, 250 (not shown in FIG. 8A, 8B, or 8C) of the housing 204. The flanges 822A, 822B may cause the arm 812 to have a greater width or extension than the arm 820.

FIGS. 9A, 9B, 9C, and 9D show the arrangement of the flexible detection clip 214 and the rigid detection clip 216 with respect to each other when the flexible detection clip 214 and rigid detection clip 216 are inserted in the housing 204. The bodies 602, 702 of the flexible detection clip 214 and rigid detection clip 216 may extend along parallel planes, and may maintain a minimum distance from each other to maintain electrical isolation from each other. The distance and/or electrical isolation between the flexible detection clip 214 and the rigid detection clip 216 may be maintained by the insulator 218 (not shown in FIGS. 9A, 9B, 9C, and 9D).

The jack 200 described herein may be used in the laptop 100 or other computing device. For example, the jack 200 can be located in a hinge 106 of the laptop 100 in other portions of the laptop 100. The jack 200 also can be used in other devices, such as, for example, mobile phones, tablet computers, desktop computers, televisions, audio players, etc.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A jack comprising:
   a contact clip; and
   a housing, the housing being generally cylindrical and bounded by an imaginary cylinder, the housing defining:
      a substantially cylindrical cavity, the substantially cylindrical cavity having an opening at a first end of the housing; and
      a contact aperture configured to receive the contact clip, the contact aperture extending from an outer surface of the housing to the cylindrical cavity; and
   wherein the contact clip is friction-fitted into the contact aperture, is located within the imaginary cylinder, and extends into the substantially cylindrical cavity.

2. The jack of claim 1, wherein the jack comprises an audio jack.

3. The jack of claim 1, wherein a diameter of the imaginary cylinder is less than 6.4 millimeters.

4. The jack of claim 1, wherein a majority of the outer surface of the housing is within 0.1 mm of the imaginary cylinder.

5. The jack of claim 1, wherein a majority of the outer surface of the housing is contiguous with the imaginary cylinder.

6. The jack of claim 1, wherein the contact clip includes an arm extending from a body and the friction-fitting of the contact clip in the contact aperture increases an angle at which the arm extends from the body.

7. The jack of claim 1, wherein:
   the contact aperture defines at least one slot in the housing; and
   the contact clip comprises at least one flange friction-fitted into the at least one slot.

8. The jack of claim 1, wherein the contact clip includes a convex portion extending into the cylindrical cavity.

9. The jack of claim 1, wherein:
   the contact aperture comprises a first aperture;
   the contact clip comprises a first contact clip;
   the housing further defines:
      a second aperture configured to receive a second contact clip, the second aperture extending from the outer surface of the housing to the cylindrical cavity; and
      a third aperture configured to receive a third contact clip, the third aperture extending from the outer surface of the housing to the cylindrical cavity; and
   the jack further comprises:
      the second contact clip friction-fitted in the second aperture, the second contact clip being located within the imaginary cylinder and extending into the cylindrical cavity; and
      the third contact clip friction-fitted in the third aperture, the third contact clip being located within the imaginary cylinder and extending into the cylindrical cavity.

10. The jack of claim 1, wherein the jack is included in a hinge of a laptop computer.

11. The jack of claim 1, wherein the imaginary cylinder has a diameter no more than five percent (5%) greater than a diameter of the housing.

12. The jack of claim 1, wherein:
   the housing includes a planar surface portion; and
   the jack further comprises a flexible printed circuit board (PCB), the flexible PCB extending along the planar surface portion of the housing and including a PCB contact, the PCB contact being in contact with the contact clip.

13. The jack of claim 12, wherein the flexible PCB extends beyond the imaginary cylinder.

14. The jack of claim 1, wherein:
   the housing further defines a securement aperture configured to receive a securement clip, the securement aperture extending from the outer surface of the housing to the cylindrical cavity; and
   the jack further comprises the securement clip, the securement clip extending through the securement aperture into the cylindrical cavity and being configured to bend toward the outer surface of the housing in response to the cylindrical cavity receiving a plug.

15. The jack of claim 14, wherein the contact aperture is closer to the first end of the housing than the securement aperture.

16. The jack of claim 14, wherein the securement clip is bounded by the imaginary cylinder.

17. The jack of claim 14, wherein:
the housing further defines:
a flexible detection aperture configured to receive a flexible detection clip, the flexible detection aperture extending from the outer surface of the housing to the cylindrical cavity; and
a rigid detection aperture configured to receive a rigid detection clip, the rigid detection aperture extending from the surface of the housing to the cylindrical cavity; and
the jack further comprises:
the flexible detection clip, the flexible detection clip extending through the flexible detection aperture into the cylindrical cavity and being configured to bend toward and contact the rigid detection clip in response to the cylindrical cavity receiving the plug; and
the rigid detection clip extending through the rigid detection aperture.

18. The jack of claim 17, wherein:
the securement clip is bounded by the imaginary cylinder;
the flexible detection clip is bounded by the imaginary cylinder; and
the rigid detection clip is bounded by the imaginary cylinder.

19. The jack of claim 17, wherein:
the contact aperture is closer to the first end of the housing than the securement aperture;
the securement aperture is closer to a front end of the housing than the flexible detection aperture; and
the flexible detection aperture is closer to the front end of the housing than the rigid detection aperture.

20. The jack of claim 1, wherein:
the housing further defines:
a flexible detection aperture configured to receive a flexible detection clip, the flexible detection aperture extending from the surface of the housing to the cylindrical cavity; and
a rigid detection aperture configured to receive a rigid detection clip, the rigid detection aperture extending from the surface of the housing to the cylindrical cavity; and
the jack further comprises:
the flexible detection clip, the flexible detection clip extending into the cylindrical cavity and being configured to bend toward and contact the rigid detection clip in response to the cylindrical cavity receiving a plug; and
the rigid detection clip extending through the rigid detection aperture.

21. The jack of claim 20, wherein the flexible detection clip includes a rounded portion, a radius of curvature of the rounded portion of the flexible detection clip becoming smaller in response to the cylindrical cavity receiving the plug.

22. The jack of claim 20, wherein the flexible detection clip and the rigid detection clip are included in a plug inserted circuit, the plug inserted circuit being configured to indicate whether the plug has been inserted into the jack based on whether the flexible detection clip is electrically coupled to the rigid detection clip.

23. An audio jack comprising:
a contact clip; and
a housing bounded by an imaginary cylinder, a majority of an outer surface of the housing being contiguous with the imaginary cylinder, the housing defining:
a cylindrical cavity, the cylindrical cavity having an opening at a first end of the housing; and
a contact aperture configured to receive the contact clip, the contact aperture extending from the outer surface of the housing to the cylindrical cavity; and
a flexible printed circuit board (PCB) coupled to the contact clip,
wherein the contact clip is friction-fitted in the contact aperture, is located within the imaginary cylinder, and extends into the cylindrical cavity.

24. An audio jack comprising:
a contact clip;
a flexible detection clip;
a rigid detection clip; and
a housing bounded by an imaginary cylinder, a majority of an outer surface of the housing being contiguous with the imaginary cylinder, the housing defining:
a cylindrical cavity, the cylindrical cavity having an opening at a first end of the housing;
a contact aperture configured to receive the contact clip, the contact aperture extending from the outer surface of the housing to the cylindrical cavity;
a flexible detection aperture configured to receive the flexible detection clip, the flexible detection aperture extending from the outer surface of the housing to the cylindrical cavity; and
a rigid detection aperture configured to receive the rigid detection clip, the rigid detection aperture extending from the outer surface of the housing to the cylindrical cavity; and
a flexible printed circuit board (PCB) coupled to the contact clip, the flexible detection clip, and the rigid detection clip;
wherein:
the contact clip is friction-fitted in the contact aperture, is located within the imaginary cylinder, and extends into the cylindrical cavity,
the flexible detection clip extends into the cylindrical cavity and is configured to bend toward and contact the rigid detection clip in response to the cylindrical cavity receiving a plug, and
the rigid detection clip extends through the rigid detection aperture.

* * * * *